United States Patent [19]

Couchoud et al.

[11] 3,941,860

[45] Mar. 2, 1976

[54] POLYVINYLIDENE FLUORIDE CONTAINING THREADS, FIBERS AND FILMS OF GOOD DYE AFFINITY, AND PROCESS FOR OBTAINING THEM

[75] Inventors: Paul Couchoud, Dardilly; Edouard Grimaud, Saint-Genis-Laval, both of France

[73] Assignee: Rhone-Poulenc-Textile, Paris, France

[22] Filed: June 3, 1974

[21] Appl. No.: 476,067

[30] Foreign Application Priority Data

June 6, 1973  France .............................. 73.20667

[52] U.S. Cl. ......... 260/900; 264/178 R; 264/178 F; 264/210 R; 264/210 F
[51] Int. Cl.² ......................................... C08L 27/16
[58] Field of Search ..................................... 260/900

[56] References Cited
UNITED STATES PATENTS

| | | | |
|---|---|---|---|
| 3,253,060 | 5/1966 | Koblitz | 260/900 |
| 3,340,222 | 9/1967 | Fang | 260/41 |
| 3,459,834 | 8/1969 | Schmitt | 260/898 |

*Primary Examiner*—Carman J. Seccuro
*Attorney, Agent, or Firm*—Stevens, Davis, Miller & Mosher

[57]  ABSTRACT

The invention relates to threads, fibers or films comprising polyvinylidene fluoride, with good dye affinity for plastosoluble and cationic dyestuffs.

More particularly, the invention relates to threads, fibers or films formed of a mixture of vinylidene fluoride homopolymer and of a copolymer containing at least 60% by weight of methyl methacrylate units and 5 to 40% by weight of units of at least one acid ethylenic comonomer, copolymerizable with methyl methacrylate.

The threads and fibers in accordance with the invention can be used in particular in the field of textiles.

7 Claims, No Drawings

POLYVINYLIDENE FLUORIDE CONTAINING THREADS, FIBERS AND FILMS OF GOOD DYE AFFINITY, AND PROCESS FOR OBTAINING THEM

The present invention relates to threads, fibers or films comprising polyvinylidene fluoride with good dye affinity for plastosoluble and cationic dyestuffs. The invention also concerns a process for obtaining the above from compositions formed of a mixture of polyvinylidene fluoride and a copolymer contributing the dye affinity.

It is known from French Pat. No. 1,390,552 to spin polyvinylidene fluoride from solutions into a polar organic solvent formed preferably of a mixture of an amide and a ketone. However, the threads obtained cannot be dyed by a subsequent dyeing process.

There have now been produced, and this is what constitutes the object of the present invention, threads, fibers and films comprising polyvinylidene fluoride with good dye affinity for plastosoluble and cationic dyestuffs, characterized by the fact that they are formed of a mixture of a vinylidene fluoride homopolymer and of a copolymer containing at least 60% by weight methyl methacrylate and 5 to 40% by weight of at least one acid ethylenic monomer copolymerizable with it, or its alkaline salt.

The invention also relates to a mixture of a vinylidene fluoride homopolymer containing at least 60% by weight methyl methacrylate and 5 to 40% of acid ethylenic monomer copolymerizable with it. This compatible mixture can be shaped by known means.

The mixture may in particular be transformed into threads or fibers in a process which also forms part of the invention and comprises wet, dry or semi-melt spinning, one or more drawings, washing and possibly a heat treatment. It can also be transformed into films by known means such as extrusion of a solution or blow-extrusion.

The vinylidene fluoride homopolymer which can be used in accordance with the present invention is preferably a polymer having a flow index at 250°C of at least 10 and preferably between 100 and 5,000. The flow index measured at 250°C represents the quantity of polymer in mg extruded in 1 minute through a nozzle of a diameter of 2 mm under a head of 10 kg/cm2.

The methyl methacrylate copolymer which can be used in accordance with the present invention contains at least 60% by weight methyl methacrylate and 5 to 40% by weight of at least one carboxylic, or preferably sulfonic, acid ethylenic monomer copolymerizable with it. However, when the acid monomer is a sulfonic acid, it is preferred to use a copolymer containing at most 20% acid monomer and at least 80% methyl methacrylate in order that it not be excessively hydrophilic, which would lead to its elimination upon subsequent washing of the yarn or of articles made with said yarns or fibers. One can also use copolymers of methyl methacrylate and an acid monomer also containing one or more other acid or non-acid comonomers which are copolymerizable with the methyl methacrylate.

Among the acid monomers which are copolymerizable with methyl methacrylate, mention may be made of acrylic acid, methacrylic acid, acrylamido-2 methyl-2 propane sulfonic acid of the formula:

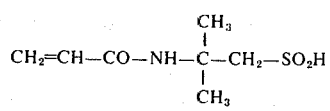

and sulfoethyl methacrylate of the formula:

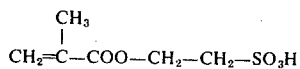

the latter two products giving particularly interesting results. The methyl methacrylate copolymer preferably contains 10 to 15% by weight of the acid comonomer or its alkaline salt.

The quantity of methyl methacrylate copolymer which can be added to the vinylidene fluoride homopolymer may vary within wide limits, depending upon the amount of acid monomer in the copolymer and the desired degree of dye affinity. In order to obtain good dye affinity for cationic dyestuffs, it is, however, generally advantageous for the mixture of polymers to contain at least 40 to 50 acid milliequivalents per kg of polymer, and preferably 50 to 100 acid milliequivalents. Furthermore, it is generally preferred not to use more than 20% of the methyl methacrylate copolymer in order to preserve the good non-inflammability properties of polyvinylidene fluoride.

The mixture of vinylidene fluoride homopolymer and methyl methacrylate copolymer in accordance with the invention is sufficiently compatible in order to obtain, by dissolving the mixture, a solution which may be spun to give threads and fibers which have no tendency to fibrillate or break, as is generally the case when it is attempted to spin a mixture of non-compatible polymers.

The invention also concerns a process for obtaining threads and fibers from the above mixture. For this, one can employ either wet spinning or dry spinning, or else semi-melt spinning.

For wet or dry spinning, the mixture of polymers is first of all dissolved in an aprotic polar organic solvent such as dimethyl formamide, dimethyl acetamide, N-methyl pyrrolidone or dimethyl sulfoxide. The concentration of polymer in the solution may vary within wide limits, although it is generally advantageous, both for reasons of economy and of technique (viscosity of the solution for instance) to use a concentration of about 20 to 25% by weight.

For semi-melt spinning, one uses the same solvents as above, although dimethyl acetamide and N-methyl pyrrolidone are preferred because of their high boiling point. In this case the spinning mixture contains at least 50% by weight of polymer mixture and preferably about 60 to 70% by weight of said polymer mixture to 40 to 30% of solvent.

In wet spinning, the spinning solution is extruded through a spinneret immersed in a coagulating bath having a base of water and of the spinning solvent used. The solvent content of the coagulating bath should generally be greater than 30% by weight, for instance 50 to 70%, in order to obtain filaments of compact structure. On the other hand, if the solvent content of the coagulating bath is less than 50%, for instance 40%, the filaments obtained have a vacuolate structure. It is generally preferred to use a solvent content of the coagulating bath of about 60% by weight in order to obtain filaments having good mechanical properties without, however, excessively slowing down the rate of coagulation.

It is furthermore particularly surprising that one can spin the polymer mixtures of the invention by wet spinning though the copolymers of methyl methacrylate and of a sulfonic acid monomer are soluble in the mixture of water and solvent used as coagulating bath.

In dry spinning, the spinning solution is extruded into air at a sufficiently high temperature to permit the evaporation of a large amount of the solvent.

In semi-melt spinning, the mixture is extruded at a temperature of the order of 150° to 200°C, depending upon the solvent used, through a spinneret and is solidified in air at room temperature.

The filaments obtained by these three types of spinning are then drawn either before or after washing with water in order to remove the residual solvent. The drawing can be effected one or more times in air, water, on a plate or on heating rollers, preferably at a temperature of between 80° and 150°C, for instance in boiling water or in air, on a plate at 120°C. This drawing at elevated temperature can possibly be preceded by a pre-drawing in air at room temperature. In order to obtain good mechanical properties, it is generally preferred to effect an overall drawing at a ratio of 5 to 7 X. This drawing can possibly be followed by an additional drawing at a low ratio, for instance 1.2 to 1.3 X, if one desires a thread of very good tenacity. Likewise, depending upon the final mechanical properties desired, one can also subject the thread to a heat treatment in relaxed condition or under tension.

In all cases, the threads thus obtained have good mechanical properties which permit their use both in the field of textiles and in the field of industrial yarns. They can be dyed by ordinary dyeing methods by means of cationic dyestuffs or plastosoluble dyestuffs, which makes it possible to obtain a very wide range of shades.

The following examples in which the parts and percentages are by weight are given by way of example to illustrate the invention without in any way limiting it.

In these examples, the measurement of specific viscosity is effected on a solution of 2 g/liter at a temperature of 25°C in dimethyl formamide.

The determination of the "CLOC" index of textile samples is a method based on ASTM Standard B 2863–70 applied in the USA relating to the determination of the "CLOC" index of plastic test specimens but using textile samples requiring a rectangular frame of inside dimensions of 5 × 16 cm.

The testing of fastness to light in the Xenotest forms the object of approved French Standard NF G 07 067 (ISO Recommendation R 105/V-1969).

The testing of fastness to washing at 60°C is the object of French Standard NF G 07 015 (ISO Recommendation 105/IV-1968), and the testing of the resistance to rubbing forms the object of French Standard NF G 07 016 (ISO Recommendation R 105/I-1959).

In the following examples, the dyestuffs are indicated by their CI reference obtained from "Colour Index," 1971 edition.

EXAMPLE 1

A. A solution is prepared containing:
23 parts of a polyvinylidene fluoride of a flow index of 190,
3.5 parts of a copolymer containing 90% by weight of methyl methacrylate units and 10% of acrylamido-2, methyl-2 propane sulfonic acid units and a specific viscosity of 1.11,
73.5 parts of dimethyl formamide.

This solution is brought to 60°C and extruded through a spinneret having 64 apertures of 0.07 mm diameter, immersed in a coagulating bath of 20°C containing 57 parts of dimethyl formamide to 43 parts of water.

After emergence from the coagulating bath, the filaments are first of all drawn in air at room temperature at a ratio of 3.4 X and then in boiling water at a ratio of 1.9 X and then washed with water in counter-current at ordinary temperature, and finally dried on rollers maintained at 120°C.

The threads obtained have the following properties:

| | |
|---|---|
| tenacity dry | 33 g/tex |
| elongation dry | 20% |
| Young's modulus | 210 g/tex |
| acid milliequivalents per kg | 57 meq |
| "CLOC" index | 29.4 |

The threads are then dyed in a 1/50 volume for 1 hr. in a bath of 105°C containing 2% dyestuff.

The dyeing was effected with 4 different dyestuffs:

| | |
|---|---|
| dyestuff A | CI Disperse Red 65 |
| dyestuff B | CI Disperse Orange 13 |
| dyestuff C | CI Basic Blue 41 |
| dyestuff D | CI Basic Blue 5 |

The results are as follows:

| | | | Fastness | |
|---|---|---|---|---|
| Dyestuff | Yield | Xenotest | Washing at 60°C | Rubbing |
| A | 4 | 4 D | 5/5 | 5/5 |
| B | 4 | 5 D | 5/5 | 5/5 |
| C | 5 | 5 R | 5/5 | 5/5 |
| D | 5 | 2–3 R | 5/5 | 4–5/4–5 |

The plastosoluble dyestuffs A and B are used with 1 g/liter of vehicle which is a mixture of aromatic esters used as vehicle for polyesters known under the Trademark LEVEGAL PT produced by Bayer.

B. By way of comparison, there is prepared a 23% solution in dimethyl formamide containing only polyvinylidene fluoride of a flow index of 190. This solution is spun exactly under the same conditions as the mixture spun under A and then the filaments are drawn also in two stages and dried as above.

The filaments obtained have the following properties:

| | |
|---|---|
| tenacity, dry | 37 g/tex |
| elongation, dry | 23% |
| acid milliequivalents per kg | 4 meq |
| "CLOC" index | 34.5 |

The threads obtained are then dyed under the same conditions as threads prepared under A with the same dyestuffs. The results are as follows:

| | | | Fastness | |
|---|---|---|---|---|
| | Yield | Xenotest | Washing at 60°C | Rubbing |
| CI Disperse Red 65 + LEVEGAL PT | 3 | 5 D | 5/5 | 5/4–5 |

-continued

| | Yield | Xenotest | Washing at 60°C | Rubbing |
|---|---|---|---|---|
| Cl Disperse Orange 13 + LEVEGAL PT | 1 | 4–5 | 5/5 | 5/5 |
| Cl Basic Blue 41 | 3 | 5–6 | 5/5 | 5/4–5 |
| Cl Basic Blue 5 | 3 | 2–3 R | 5/5 | 5/5 |

From these two tests A and B, it clearly appears that the yield of dyeing which is good with the mixture of polymers is definitely less good with the polyvinylidene fluoride alone, the scale ratings going from 1 to 5.

EXAMPLE 2

A solution is prepared containing:
23 parts of polyvinylidene fluoride having a flow index of 190,
3.5 parts of a copolymer containing 85% by weight methyl methacrylate units and 15% by weight of sulfoethyl methacrylate units, of a specific viscosity of 1.9,
73.5 parts of dimethyl formamide.

The solution thus obtained is spun at 60°C and extruded, whereupon the filaments are drawn, washed and dried in the same manner as in Example 1.
The threads obtained have the following properties:

| | |
|---|---|
| tenacity, dry | 29 g/tex |
| elongation, dry | 17% |
| number of acid milli-equivalents per kg | 59 meq |

The threads are dyed in the same manner and with the same dyestuffs as in Example 1.
The results are as follows:

| | Yield | Xenotest | Washing at 60°C | Rubbing |
|---|---|---|---|---|
| Cl Disperse Red 65 + LEVEGAL PT | 4 | 4 D | 4–5/5 | 5/5 |
| Cl Disperse Orange 13 + LEVEGAL PT | 3 | 5 D | 5/5 | 5/5 |
| Cl Basic Blue 41 | 5 | 5 R | 5/5 | 5/5 |
| Cl Basic Blue 5 | 5 | 2–3 R | 5/5 | 5/5 |

EXAMPLE 3

A solution is prepared containing:
23 parts of polyvinylidene fluoride of a flow index of 190,
1.2 parts of a copolymer containing 64% by weight methyl methacrylate units and 36% by weight methacrylic acid units,
75.8 parts of dimethyl formamide.

This solution is spun in the same manner as in Example 1 (A), whereupon the filaments are drawn in air at a ratio of 3.4 X and then drawn again in boiling water at a ratio of 1.8 X, washed with water at room temperature, and finally dried on rollers maintained at 120°C.
The properties of the threads are as follows:

| | |
|---|---|
| tenacity, dry | 30 g/tex |
| elongation, dry | 21% |
| "CLOC" index | 33.6 |

The yarns are then dyed in the same manner as in the preceding examples.
The following results were obtained:

| | Yield | Xenotest | Washing at 60°C | Rubbing |
|---|---|---|---|---|
| Cl Disperse Orange 13 + LEVEGAL PT | 2 | 4–5 D | 5/5 | 5/5 |
| Cl Basic Blue 41 | 3 | 6 D | 5/5 | 5/5 |
| Cl Basic Blue 5 | 3 | 2 | 5–4/5 | 5/5 |

EXAMPLE 4

A solution is spun containing:
23 parts of polyvinylidene fluoride of a flow index of 190,
2.3 parts of a copolymer containing 85% by weight methyl methacrylate units and 15% by weight sulfoethyl methacrylate units, of a specific viscosity of 0.74,
74.7 parts of dimethyl formamide.

The above solution is spun in the same manner as in Example 3 and the filaments then treated in the same fashion.
The filaments obtained have the following properties:

| | |
|---|---|
| tenacity, dry | 26 g/tex |
| elongation, dry | 16% |

The threads obtained are then dyed by the process used in Example 1 (A). The results obtained are as follows:

| | Yield | Xenotest | Washing at 60°C | Rubbing |
|---|---|---|---|---|
| Cl Disperse Red 65 + LEVEGAL PT | 5 | 4 D | 5/5 | 5/5 |
| Cl Disperse Orange 13 + LEVEGAL PT | 3 | 4–5 D | 5/5 | 5/5 |
| Cl Basic Blue 41 | 5 | 4–5 R | 5/5 | 5/5 |
| Cl Basic Blue 5 | 5 | 2 | 5/5 | 5/5 |

EXAMPLE 5

A solution is prepared having the same composition as that of Example 1 (A). This solution is spun wet into a coagulating bath at 20°C formed of 57% dimethyl formamide and 43% water through a spinneret of 64 orifices of 0.07 mm diameter.
Upon their emergence from the coagulating bath, the filaments are drawn in air at room temperature at a ratio of 1.8 X and then washed at room temperature countercurrent, and drawn again in boiling water at a ratio of 3.3 X and dried on rollers maintained at 100°C.
The properties of the threads are as follows:

| | |
|---|---|
| tenacity, dry | 34 g/tex |
| elongation, dry | 20% |
| Young's modulus | 220 g/tex |
| number of acid milli-equivalents per kg | 55 meq |
| "CLOC" index | 29.4 |

The threads are then dyed in a 1:50 bath volume for 1 hour at 105°C in a bath containing 10% dyestuff, in the presence of 1 cc of formic acid and in the presence of waterdispersible orthophenylphenol (known under the Trademark SOLVANT OP manufactured by Produits Chimiques Ugine Kuhlman).

The results obtained are as follows:

|  | Yield | Xenotest | Fastness Washing at 60°C | Rubbing |
|---|---|---|---|---|
| Cl Disperse Red 65 | 5 | 4–5 D | 5/3–4 | 4 |
| Cl Disperse Violet 48 | 5 | 3–4 D | 5/4–5 | 4–5 |
| Cl Basic Blue 41 | 5 | 6–7 | 5/5 | 5 |
| Cl Basic Orange 41 | 5 | 6 | 5/5 | 4/5 |

We claim:

1. Threads, fibers and films of good dye affinity for plastosoluble and cationic dyestuffs, comprising a mixture formed of a vinylidene fluoride homopolymer and a copolymer containing at least 60% by weight methyl methacrylate units and 5 to 40% by weight of units of a sulfonic acid ethylenic monomer selected from the group consisting of acrylamido-2-methyl-2-propane sulfonic acid and sulfoethyl methacrylate, or the alkaline salt, said mixture containing at least 40 acid milliequivalents per kg of polymer.

2. A spinnable and film formable compatible mixture of vinylidene fluoride homopolymer and a copolymer containing at least 60% by weight methyl methacrylate units and 5 to 40% by weight of a sulfonic acid ethylenic monomer selected from the group consisting of acrylamido-2-methyl-2-propane sulfonic acid and sulfoethyl methacrylate, or the alkaline salt, said mixture containing at least 40 acid milliequivalents per kg of polymer.

3. Threads, fibers and films according to claim 1, wherein the copolymer is obtained from at least one other acid or non-acid comonomer in addition to the methyl methacrylate and the sulfonic acid ethylenic monomer.

4. Threads, fibers and films according to claim 1, wherein the polyvinylidene fluoride has a flow index of at least 10, measured at 250°C.

5. Threads, fibers and films according to claim 1, wherein the polyvinylidene fluoride has a flow index of 100 to 5,000.

6. Threads, fibers and films according to claim 1, having 40 to 100 acid milliequivalents per kg of polymer mixture.

7. A process for the producing of threads, fibers or films according to claim 1, comprising spinning a composition in an aprotic polar organic solvent of a mixture of polyvinylidene fluoride and of a copolymer containing at least 60% by weight methyl methacrylate units and 5 to 40% by weight of units of at least one acid ethylenic monomer copolymerizable with it and thereafter drawing the filaments in one or more steps before or after washing.

* * * * *